United States Patent [19]
Fourrey

[11] 3,944,302
[45] Mar. 16, 1976

[54] SLIDING RUNNERS, ESPECIALLY FOR SEATS IN VEHICLES

[75] Inventor: Francois Fourrey, Etampes, France

[73] Assignee: Establissements Bertrand Faure, France

[22] Filed: Oct. 25, 1974

[21] Appl. No.: 518,184

[30] Foreign Application Priority Data
Oct. 31, 1973 France .............................. 73.38916

[52] U.S. Cl. ................................. 308/6 R; 308/3.8
[51] Int. Cl.$^2$ ........................................ F16C 17/00
[58] Field of Search .............. 308/6 R, 3.8; 312/341; 297/216

[56] References Cited
UNITED STATES PATENTS

| | | | |
|---|---|---|---|
| 3,545,716 | 12/1970 | Coiautti | 308/3.8 X |
| 3,685,872 | 8/1972 | Babbs | 308/6 R |
| 3,759,587 | 9/1973 | Christin | 308/3.8 X |
| 3,850,484 | 11/1974 | Coosin | 308/6 R |

Primary Examiner—Robert R. Song
Assistant Examiner—Gene A. Church
Attorney, Agent, or Firm—Larson, Taylor and Hinds

[57] ABSTRACT

The invention aims at sliding runners comprising two sectional irons 1 and 2 mounted so as to be able to slide longitudinally one along the other through the agency of ball-bearings 3.

The lower sectional iron, in the form of a U, comprises two vertical flanks 5 extended outwards by bent-down parts 6 in the shape of angle-irons, and the upper sectional iron 2, in the form of an inverted U, comprises a top 10 and two vertical flanks 11 extended inwards by horizontal ledges 12 extending under the respective bent-down parts, each ball-bearing 3 being compressed between a bent-down part and the opposite walls. Rigid bracings 19 are inserted between the flanks 5.

Applications: longitudinally adjustable supports for front seats of motor vehicles.

10 Claims, 3 Drawing Figures

SLIDING RUNNERS, ESPECIALLY FOR SEATS IN VEHICLES

The invention is concerned with sliding runners designed to permit and to guide the relative slippage of two structures mounted one above the other, and relates more particularly but not exclusively to the class of runners for vehicle seats that can be moved backwards and forwards (since in their case the application of the invention presents the most interest).

The runners of the type in question, with which the invention is concerned, consist essentially of a lower sectional iron integral with a first structure such as the floor of a vehicle, and an upper sectional iron carrying a second structure such as a seat, these two lower and upper sectional irons having respectively a roughly U-shaped cross-section and a roughly inverted-U-shaped cross-section and being fitted one inside the other so as to slide one along the other by the agency of balls.

The main aim of the invention is to produce these runners so that they respond better than hitherto to various practical requirements, especially as regards resistance to a mutual vertical dislocation of their constituent sectional irons when there is an impulse for one of these irons to rock relatively to the other.

This resistance must in particular be very high in the case of seats in motor vehicles: it has to be avoided that the application of a large horizontal thrust to the back of such a seat results in a dislocation of the seat runners, for example because of a sudden change in the speed of the vehicle.

Sliding runners of the above kind, conforming to the invention, are characterized in that the two flanks of the lower sectional iron are each extended externally by a bent-down part, shaped like an angle-iron, presenting successively a first flap extending downwards from the top of the said flank (to which it is joined by a curved or arched zone), and a second, horizontal flap extending outwards from the bottom of the first flap, and characterized in that the two flanks of the upper sectional iron envelop the bent-down parts of the lower sectional iron and are each extended inwards by a horizontal ledge reaching just beneath the horizontal flap of the respective bent-down part, each ball race being constituted by the two adjacent surfaces of one bent-down part facing respectively upwards and outwards and by the opposing surfaces of the upper sectional iron.

In the preferred modes of embodiment, use is made of one/or other of the following arrangements:

the opposing faces of the upper sectional iron, which define each of the ball races, comprise a horizontal zone set back lower than the middle part of the top of that sectional iron, which is likewise flat and horizontal, bracing elements are disposed in the lower sectional iron so as to prevent the mutual approach of the flanks thereof, in a runner according to the preceding paragraph with which the flanks of the lower sectional iron are vertical, the bracing elements consist of a rigid corrugated strip with a width equalling the distance apart of the flanks, each lower edge of the upper sectional iron is extended horizontally towards the inside of this sectional iron so as to reach beneath the whole of the corresponding bent-down part (of the lower sectional iron) until at its end it rises again into the gap comprised between this bent-down part and the corresponding opposing flank of the lower sectional iron.

Apart from these main arrangements, the invention includes certain other arrangements which are preferably employed at the same time and which will be discussed later in more detail.

In what follows, two preferred modes of embodiment of the invention will be described, of course non-restrictively, with reference to the attached drawing.

FIG. 1 of this drawing is an end view of a sliding runner set up in accordance with the invention.

Figure 1:
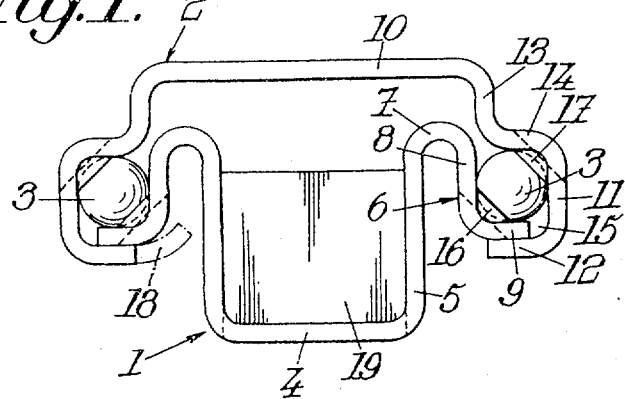

In each case the runner comprises a lower sectional iron 1 and an upper sectional iron 2 which both have the same lengthwise vertical plane of symmetry and are suitable for fitting longitudinally one inside the other so as to travel one along the other through the agency of the balls 3.

The lower sectional iron has a roughly U-shaped cross-section and comprises a flat bottom 4 and two vertical flanks 5.

Each of these flanks 5 is extended externally by a bent-down part 6 in the form of an angle-iron, the junction between each flank and the bent-down part extending it forms a curve or rib 7 with a semicircular profile.

Each bent-down part, shaped like an angle-iron, comprises a first flap 8 extending vertically downwards from the rib 7 and a second flap 9 extending horizontally outwards from the bottom edge of the first flap.

The length of the vertical flaps 8 is less than that of the wings 5 so that the horizontal flaps 9 are located at a higher level than the bottom 4.

The upper sectional iron 2 in cross-section presents roughly the shape of an inverted U and comprises a flat bottom or "top" 10 and two vertical flanks 11 enveloping the lower sectional iron including its bentdown parts.

Each of the two flanks of this upper sectional iron is extended inwards by a horizontal ledge 12 which extends just beneath the corresponding horizontal flap 9.

In the preferred mode of embodiment that is illustrated, the middle part of the top of the upper sectional iron, which is flat and horizontal, is joined to each of its vertical flanks 11 by a hollow zone in the shape of a dihedron comprising a vertical side 13 and a horizontal area 14.

The ensemble of the four opposite faces comprising the flaps 8 and 9 of a given bent-down part and by the opposite walls of the upper sectional iron (walls constituted respectively by an area 14 and by the adjacent flank 11 which together form a dihedron) presents a cross-section in the general shape of a square with a length of side equal to that of the diameter of the balls 3.

These four faces define a passage collectively suitable for accepting and guiding the said balls.

Each of these balls rests pointwise on a horizontal flap 9, supports pointwise an area 14 as well as the loads transmitted to that area (the weights of the upper sectional iron and the seat which it carries), and all the time receives a horizontal thrust from the two vertical walls 8 and 11.

This permanent horizontal pressure is obtained by designing the lower sectional iron in such a way that it has a slight tendency to open elastically and/or the upper sectional iron in such a way that it has a slight tendency to close elastically.

The said permanent horizontal pressure on the balls offers the advantage of ensuring continuous contact between these balls and the two sectional irons, which eliminates play — a cause of noise and untoward movements of the balls — and this without a need for inserting additional elements such as longitudinal bracings or strips of foil in the ball-races.

The travel of the balls in their passages is restricted by their coming up against the embossments 16 and 17.

These embossments are advantageously stamped out towards the interior of the passages, i.e. respectively into the rounded edges of the two dihedra constituting these passages and belonging respectively to the two sectional irons.

Advantageously two balls are provided in each of the two passages 15, and the travel of each of these balls along the bent-down part 6 is restricted by two embossments 16 and that along the opposite dihedron by two embossments 17.

Each of these two limits to the sliding of the upper sectional iron along the lower sectional iron is determined by the simultaneous abutment of each of these four balls against an embossment 16 and an embossment 17.

Each of the two sectional irons is advantageously composed of a single plate of standard steel which may be relatively thin; its thickness can be of the order of millimeter.

The runner thus embodied offers an excellent resistance to vertical dislocation.

If desired, and although this is not indispensable, this resistance to dislocation can be further increased by adopting one and/or the other of the following measures.

According to the first of these measures, the lower horizontal ledges 12 of the upper sectional iron are extended horizontally towards the inside of this sectional iron, and the end 18 of each ledge can even rise up to enter the gap, under the respective rib 7, contained between the flank 7 and the bent-down part 6 opposite to it, as illustrated by broken lines in FIG. 1.

This first measure makes it very difficult for the two sectional irons to be mutually dislocated, since such a dislocation would require that the upper sectional iron opens out sufficiently for the above extreme edges 18, initially relatively close together, to move apart to a distance greater than the separation of the free edges of the two horizontal flaps 9 of the bent-down parts.

According to the second measure, the coming together of the two flanks 5 of the lower sectional iron is made very difficult, indeed impossible, by inserting rigid bracing elements between the two flanks.

Such elements can be pieces 19 punched into the bottom 4, a solution which is mainly of value for the ends of the sectional iron, seeing that it is generally preferred not to weaken the intermediate regions by drilling.

The bracing elements can also be constituted by a rigid strip 20 (FIG. 3), corrugated according to a continuous or broken line, with a constant width equal to the distance apart of the two flanks: this strip may be joined by welding or in any other desired manner to the bottom 4 and/or the flanks needing to be braced.

Figure 2:
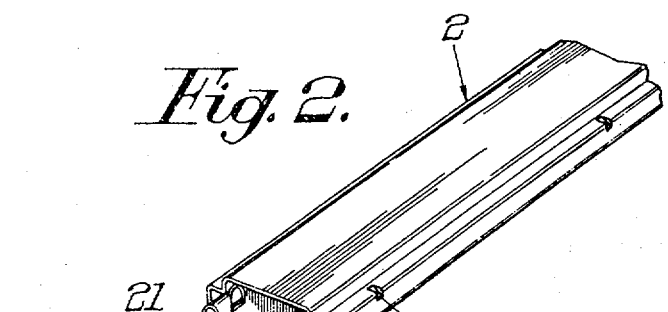
FIG. 2 is a perspective view of this runner.
Figure 3:
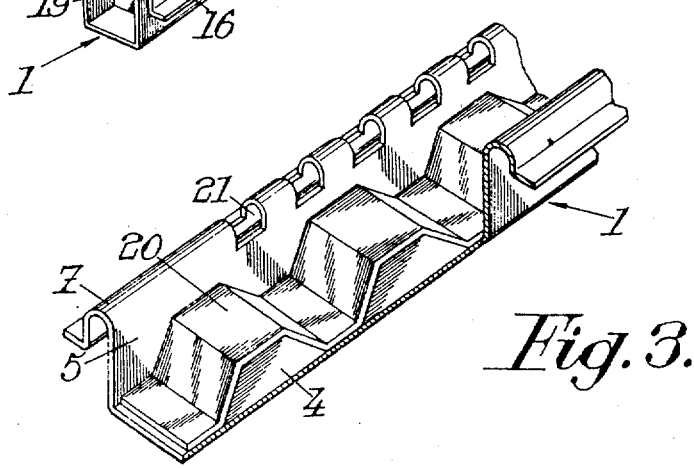
FIG. 3 is a perspective view, partly cut away, of a variant of the lower sectional iron included in such a runner.

The sliding runner described above moreover lends itself admirably to the fitting of a locking system allowing the upper sectional iron to be fixed in one or other of a plurality of distinct longitudinal positions relative to the lower sectional iron, system of the type comprising a movable bolt longitudinally integral with the upper sectional iron and suitable for engagement in the teeth of a rack that is integral with the lower sectional iron: indeed a particularly strong rack can be very simply made by cutting notches 21 in one of the ribs 7 of the lower sectional iron, as can be seen in FIGS. 2 and 3.

As a matter of course, and as already results from what has been said, the invention is no way restricted to the modes of application and embodiment that have been more especially considered; on the contrary it embraces all the variants thereof, notably those where certain of the wall elements described above as vertical would in reality be not vertical but inclined to the vertical.

I claim:

1. A sliding runner comprising a first channel section member comprising a pair of flanks defining a channel therebetween, a second channel section member which comprises a base and a pair of flanks defining a channel therebetween and in which the first channel section member is fitted with the channel of one member open towards the base of the other, each flank of the first channel section member having a portion which extends backwardly in the direction away from the mouth of the channel towards the base of the first channel section member and then outwardly from the flank, the distal end of each flank of the second channel section member extending beyond the said outwardly extending portion of the adjacent flank of the first channel section member and inwardly along the rear face of said outwardly extending portion and forming with the opposed faces of the backwardly and outwardly extending portion of said adjacent flank an enclosure for a ball race, and a plurality of balls in each said enclosure facilitating sliding of said two members longitudinally relative to one another.

2. A sliding runner according to claim 1 wherein the flanks of the first channel section member are parallel.

3. A sliding runner according to claim 2 wherein the said backwardly extending portion of each flank of said first channel section member is parallel to the flank.

4. A sliding runner according to claim 1 wherein the second channel section member is step-sided, each flank having an outwardly extending intermediate portion which forms a wall of said enclosure.

5. A sliding runner according to claim 1 wherein the second channel section member has a flat base web from which its flanks extend perpendicularly.

6. A sliding runner according to claim 1 wherein the inwardly extending portion of each flank of the second channel section member extends behind the whole of the outwardly extending portion of the adjacent flank of the first channel section member and then rearwardly into a gap between the latter portion and said adjacent flank.

7. A sliding runner according to claim 1 wherein bracing elements located in the first channel section member prevent the mutual approach of its flanks.

8. A sliding runner according to claims 2 and 7 wherein the bracing elements are constituted by a rigid corrugated strip the width of which is equal to the distance apart of the two flanks of the first channel section member.

9. A sliding runner according to claim 1 wherein the first channel section member is anchored to a first surface and the second channel section member carries a structure above said surface for sliding with said second channel section member relative to said surface.

10. A sliding runner according to claim 1 wherein the balls are permanently compressed in their ball-races by at least one of (a) the tendency of the first channel section member to open out elastically and (b) the tendency of the second channel section member to close up elastically.

* * * * *